United States Patent [19]
Borchert et al.

[11] 3,773,687
[45] Nov. 20, 1973

[54] AQUEOUS TERTIARY BUTYL HYDROPEROXIDE
[75] Inventors: Alfred E. Borchert, Cherry Hill, N.J.; Walter A. Mameniskis, Drexel Hill; Frank W. Melpolder, Wallingford, both of Pa.
[73] Assignee: Atlantic Richfield Company, New York, N.Y.
[22] Filed: June 20, 1972
[21] Appl. No.: 264,448

[52] U.S. Cl. .......... 252/426, 260/610 A, 260/610 S
[51] Int. Cl. ............................................. C07c 73/06
[58] Field of Search................ 252/426; 260/610 A, 260/610 S

[56] References Cited
UNITED STATES PATENTS
2,573,947  11/1951  Bell et al......................... 260/610 A Primary Examiner—Patrick P. Garvin
Attorney—John C. Martin et al.

[57] ABSTRACT

The decomposition rate of an aqueous solution containing about 60–75 weight percent tertiary butyl hydroperoxide is stabilized by maintaining the aqueous solution at a temperature of from about 45°C. to about 80°C. for from 0.5 to 10 days. The concentration of the tertiary butyl hydroperoxide in the stabilized product is at least 95 percent of that of the unstabilized solution because only a small fraction of the hydroperoxide is decomposed by the stabilizing treatment.

2 Claims, No Drawings

AQUEOUS TERTIARY BUTYL HYDROPEROXIDE

BACKGROUND OF THE INVENTION

1. Field of the Invention

This invention relates to the stabilization and/or purification of an aqueous solution of tertiary butyl hydroperoxide.

2. Prior Art

Peroxide catalysts have long been employed for catalyzing the polymerization of precursors comprising monomers such as methylmethacrylate or styrene. Resin technologists have made significant use of an aqueous solution of about 70 weight percent concentration tertiary butyl hydroperoxide as a polymerization catalyst. However, unpredictable variations in performance have sometimes occurred, thus requiring monitoring of the polymerization by a skilled operator. Hence, such a convenient catalyst has generally been unsuited for completely automated production lines. There has been a long standing demand for an aqueous solution of tertiary butyl hydroperoxide (conveniently abbreviated as TBHP) having performance characteristics which were sufficiently reliable that decomposition rates at a moderate temperature such as 50°C. could be predicted.

The general teaching of the prior art has been that the properties of the previously marketed grades of aqueous solutions of TBHP were attributable predominantly to the inherent characteristics of the pure material. Autocatalysis of an unpredictable nature has been employed to describe some of the unpredictable behavior of various types of peroxide compositions. The reputation of most compositions having any peroxide or hydroperoxide characteristics has been so well established for variability that little hope for reliable stability has existed. Although, for several decades, there has been the ever increasing demand for aqueous solutions of TBHP having a truly stable decomposition rate, both the manufacturers and the users of the aqueous TBHP solutions deemed the variabilities in decomposition rate to be inherent limitations affecting the usage of TBHP, so that the long-standing demand for the stabilized solution was not met.

SUMMARY OF THE INVENTION

In accordance with the present invention, an aqueous solution containing at least about 60 percent but not more than about 75 percent by weight TBHP is heated to a temperature of at least about 45°C. but not more than about 80°C. and maintained at the controlled heating temperature for from about 0.5 day to about 10 days to provide a stabilized solution containing at least 95 weight percent of the TBHP content of the raw solution, that is, the solution prior to the stabilization treatment. It is believed that there might be certain unidentified impurities of a peroxide nature in the raw solution, and that such impurities might catalyze the decomposition of the raw solution of TBHP. It is possible that the controlled thermal treatment brings about a selective destruction of such catalytic impurities without significant decomposition of the desired principal product, tertiary butyl hydroperoxide. The stabilized solution is characterized by its ability to withstand a test treatment at 50°C. for a period of 4 days while maintaining a substantially uniform decomposition rate, the cumulative decomposition during said 4 day test being less than about one percent by weight of the tertiary butyl hydroperoxide.

GENERAL DESCRIPTION OF PROCESS

An aqueous solution of tertiary butyl hydroperoxide having a TBHP content of at least 60 weight percent and not more than 75 weight percent corresponding to an aqueous solution containing 23.18 to 37.54 mole percent TBHP (76.82 to 62.46 mole percent water, or a unit mol ratio of water to TBHP of about 2), and desirably, in the 65–70 weight percent range, is aged at about 50°C. (122°F.) for a period of from about 0.5 day to about 10 days, whereby the desired stability is achieved.

After the aqueous solution has been subjected to the controlled aging, the rate of decomposition thereof is sufficiently stable over a subsequent four day test period at 50°C. that conventional graphing of such rate of decomposition would indicate substantially constant decomposition rate during such subsequent test period.

There is the possibility that the initial raw aqueous solution of tertiary butyl hydroperoxide contains some peroxide impurities which have a catalytic influence. The presence of such catalytic peroxide impurities might accelerate the decomposition in ways which can vary to impart unreliability to the composition. If the unreliability of the raw solution is to be thus explained, then the controlled aging might have the surprising effect of destroying such peroxide catalytic impurities and permitting the extremely high purity tertiary butyl hydroperoxide to assert stable characteristics not previously attributed to TBHP.

There is also the possibility that the thermal treatment at 45–80°C. over a controlled period of time leads to the formation of unidentified catalytic stabilizers, whereby the subsequent decomposition rate is stabilized over a prolonged period of time. Whatever the mode of operation, the significant advantage of achieving an aqueous solution having stable and reliable decomposition rates imparts usefulness to the controlled aging step and to the composition prepared thereby.

DESCRIPTION OF PREFERRED EMBODIMENTS

The invention is further clarified by reference to a plurality of examples.

EXAMPLE I

An aqueous solution containing 69 weight percent tertiary butyl hydroperoxide is heated at 50°C. for a period of 180 hours. Initially the relative decomposition rate in units of convenience was found to be 2.5. After 180 hours of controlled aging at 50°C., the relative decomposition rate was 0.9. An analysis of the amount of peroxide after the 180 hours of aging at 50°C. was essentially 99 percent of that of the initial solution, so that the decomposition during the controlled aging resulted in the loss of only about 1 percent of the peroxide content, conveniently described as a loss of only about 1 percent of the TBHP of the solution.

In order to evaluate and measure the stability of the stabilized solution, it was maintained at 50°C. during a period of 4 days and at the end of such period, the relative decomposition rate was 0.9, as at the beginning of the test of stabilized material. The conventional presentations of data in graphical form indicate a substantially constant rate of decomposition during the 4 day test, and such stabilization indicates a significant improvement over the aqueous solutions of TBHP conventionally marketed by the prior art but does not indicate an absolute freedom from measurable change during the 4 day test. Such constant rate of decomposition over a period of 4 days is a significant advantage over the varieties of aqueous solutions of tertiary butyl hydroperoxide marketed commercially prior to the present invention.

An aqueous solution containing 61 weight percent tertiary butyl hydroperoxide is heated to 80° for a period of 13 hours to impart advantageous stability thereto. Prior to the thermal treatment, the relative decomposition rate of the raw solution measured at 50°C. is 2.5 in units of convenience. After the 13 hours of controlled aging at 80°C., the relative decomposition rate at 50°C. is 0.9. A sample of the stabilized product is tested and it is shown that after 4 days further aging at 50°C., the relative decomposition rate of the aqueous solution of tertiary butyl hydroperoxide is 0.9, thus indicating that the thermal treatment is effective in stabilizing the decomposition rate of the tertiary butyl hydroperoxide. Moreover, it is shown that the controlled aging at 80°C. is not troublesomely wasteful of the raw material, in as much as the stabilized composition has about 98 percent of the tertiary butyl hydroperoxide content of the raw solution.

EXAMPLE III

An aqueous solution containing 74 weight percent tertiary butyl hydroperoxide is heated at 60°C. for 4 days (96 hours) to bring about a stabilization of the decomposition rate. Prior to the stabilization, the relative decomposition rate of the raw solution measured at 50°C. is 2.5 in units of convenience, but after the controlled aging for 4 days at 60°C., the relative decomposition rate measured at 50°C. is 0.9. Analytical procedures for the concentration of the tertiary butyl hydroperoxide show that the concentration of the stabilized solution is approximately 99 percent that of the initial solution.

By a series of tests it is established that the temperature for the thermal stabilization treatment should be within the range from about 45°C. to about 80°C., and that the time should be correlated with the temperature, and should be at least 12 hours (0.5 day) even for 80°C., but should be not more than 10 days (240 hours) at 45°C. An important advantage of the thermal stabilization method is that the amount of tertiary butyl hydroperoxide decomposed as a result of the thermal treatment is less than 5 percent of the initial starting material. The concentration of the tertiary butyl hydroperoxide in the aqueous solution should be at least 60 percent but less than 75 percent by weight, corresponding approximately to 2 moles of water per mole of tertiary butyl hydroperoxide. At ambient temperature, the thermally stabilized aqueous solution has long term stability. In order to measure satisfactorily the relative rate of decomposition, the test is at the standard temperature of 50°C. The compositions benefiting from the process of the present invention have the advantageous characteristic of maintaining a substantially constant relative decomposition rate during a test at 50°C. for 4 days, less than 1 percent of the TBHP being decomposed during such four day test.

Various modifications of the invention are feasible, and the preferred embodiments are illustrative of appropriate procedures, the invention being defined in the appended claims.

The invention claimed is:

1. A composition consisting essentially of water and tertiary butyl hydroperoxide, the tertiary butyl hydroperoxide being in a concentration of at least 60 percent but less than 75 percent by weight, in the aqueous solution, said composition being characterized by a constant rate of decomposition of tertiary butyl hydroperoxide over a period of about 4 days at about 50°C., such constancy of decomposition rate being attributable to pretreatment by a thermal aging treatment of the aqueous solution at a temperature of from about 45°C. to about 80°C. for from about 0.5 to about 10 days.

2. The method consisting of preparing an aqueous solution consisting essentially of tertiary butyl hydroperoxide in a weight concentration of at least 60 percent but not more than 75 percent and water in a weight concentration of at least about 25 percent but not more than about 40 percent, heating the thus prepared aqueous solution of tertiary butyl hydroperoxide at a temperature of from about 45°C. to about 80°C. for from about 0.5 to about 10 days, said heating bringing about a decomposition of less than about 5 percent by weight of the tertiary butyl hydroperoxide, and cooling said solution, whereby the decomposition rate of the main body of the tertiary butyl hydroperoxide solution is stabilized.

* * * * *